Patented Sept. 11, 1923.

1,467,321

UNITED STATES PATENT OFFICE.

HENRY HICKS HURT, OF YONKERS, NEW YORK.

BINDER AND PROCESS OF MAKING SAME.

No Drawing. Application filed April 19, 1922. Serial No. 555,629.

*To all whom it may concern:*

Be it known that I, HENRY HICKS HURT, a citizen of the United States, residing at Yonkers, in the county of Westchester and State of New York, have invented certain new and useful Improvements in Binders and Processes of Making Same, of which the following is a specification.

This invention relates to binders and processes of making same; and it comprises as a new composition of matter adapted for use as a binder, an ammoniated sulfite waste liquor freed of much, or most, of its mineral bases and usually containing some $P_2O_5$, said composition being adapted to dry down to a form insoluble in water at baking heats insufficient to carbonize; and it further comprises a method of making such a composition wherein sulfite waste liquor is freed of lime with sulfuric acid, neutralized with ammonia and, usually, treated with a little phosphoric acid or ammonium phosphate, and the liquid separated from precipitated insolubles; all as more fully hereinafter set forth and as claimed.

Concentrated sulfite waste liquor preparations are largely used as binders for granular materials, as in making sand cores; these preparations being usually produced from the thin or weak sulfite waste liquor of the pulp mills by neutralizing with milk of lime and evaporating to about 30° Baumé in vacuo. These materials are thick, viscous liquids of good binding power and carry about 50 per cent of dissolved solid matters. Nothing very definite is known as to the chemical nature of these dissolved solids but they are usually called lignosulfonates for the sake of a name. The acid sulfite of the original liquor used in digesting the wood goes into organic combination with the "lignone" to give new soluble bodies; hence the name. In addition to the "lignosulfonates" of lime, or of lime and of magnesia, the liquid contains small amounts of sugars and miscellaneous "extractives."

While these preparations are, as stated, excellent binders they suffer in some relations from the disadvantage that the solids of the liquor remain soluble and are more or less hygroscopic after drying. They do not become insoluble at any temperature short of that at which carbonization or charring takes place; and carbonization reduces and finally destroys their bonding action. All the lignosulfonates of the heavy metals are soluble and drying does not render them insoluble. In the case of sand cores for foundry castings this solubility or hygroscopicity of the binder sometimes results in the weakening of the bond under the action of steam or moisture. This is undesirable. In the use of these sulfite waste liquor preparations as binders for sand it is customary to use a little clay as this materially increases the strength and moisture resistance of the bond. This, however, for various reasons, is not always desirable and in any event is an additional complication. Another popular type of binders for sand cores and the like is some type of viscous oil; linseed oil or the like. Oil bonded cores when properly baked do not lose their bond under the influence of moisture or water vapor; they are in a measure waterproof. But the oil is expensive and requires a long baking at a high temperature and the smoke and vapors given off are unpleasant. Many efforts have been made to combine the advantages of oil binders with those of sulfite waste liquors by the production of emulsions; but these preparations do not combine all the advantages of both ingredients; nor are they waterproof.

In the present invention I have devised a method of making a sulfite waste liquor preparation as a binder which has the advantage of drying down to an insoluble condition at a moderate heat; a heat insufficient to carbonize. Instead of losing strength in baking, the strength increases; sometimes very greatly. In accomplishing this result, I remove the mineral bases from sulfite waste liquor and replace them by ammonia. The binding strength of the ammoniated sulfite waste liquor is, comparatively, very great and the cores made with it are resistant to water, moisture and steam.

Any of the commercial concentrated sulfite liquor preparations may be used. I regard the preparations made by neutralizing prior to evaporation as the most advantageous but others may be used. The liquor as it comes from the digestor, the "thin liquor," may be used without concentration but is not as advantageous. It is better to use the concentrated material of at least 30° Baumé. The density of the initial material may be so adjusted as to give a final preparation of 30° Baumé.

The bases in the sulfite waste liquor to be removed are for the most part lime or lime and magnesia. For the sake of economy I generally remove the lime, or the greater part of it, with sulfuric acid. Sulfate of ammonia may be employed, but sulfuric acid is cheaper and works better. A commercial sulfite waste liquor preparation of say 32.5° Bé. is treated with the amount of sulfuric acid corresponding to the lime present not already in combination as sulfate. A precipitate of calcium sulfate forms. Without removing this precipitate the liquor is next neutralized with water of ammonia. If such magnesia is present it is generally advisable to employ some ammonium phosphate together with the ammonia. The liquor is filter-pressed to free it of insolubles and forms my new binder.

In use the aforesaid binder is employed with about 60 times as much sand. Admixture may be facilitated by the addition of water before or after mixing the liquor with the sand. Ordinarily the binder is added to the sand and then as much water as may be deemed desirable. No clay is necessary to ensure a strong bond. It may be used but it is not necessary.

Sand bonded with this material and baked at a temperature of 450° F., using good sharp sand, gives cores of comparatively great tensile strength which is not forfeited by short immersion in water by damp air or by steam. The cores may be buried in wet sand and will retain their bond.

Various oils can be readily incorporated into a binder made as described and such an addition is often advantageous. While linseed oil and other vegetable oils can be employed I regard it as better to use non-saponifying mineral oils such as the petroleum oils. Viscous residual or topped oils may be used but the viscous crude oils available on the market serve well. Crude petroleum oil with an asphalt base is a particularly desirable type of oil. This addition materially increases the waterproof qualities and also gives an increase in tensile strength. The amounts of oil desirable vary with the purpose of the binder, but ordinarily, I use somewhere between 5 and 30 per cent. Small proportions give good results. For example, a core made with liquor containing 5 per cent of crude oil after baking showed 155 pounds tensile strength and after immersion for 5 minutes the strength was still 150 pounds. It took 15 minutes immersion to bring down the strength materially.

Cores made with the described binder are very satisfactory in the foundry. A composite binder containing added viscous petroleum oil is particularly satisfactory.

In the method of manufacture described I do not aim to make an absolute removal of all the mineral bases present. It is sufficient for my purposes that the bases be reduced to, say, 2.5 per cent or less. The phosphate may or may not be used; when it is, the resulting composition on analysis shows some $P_2O_5$. Sulfuric acid does not completely remove the lime; an amount is left corresponding to the solubility of calcium sulfate in the liquid. In estimating the amount of sulfuric acid to be added to the liquor for precipitating lime, allowance is made for calcium sulfate already present; that is, for the calcium sulfate which may be in the liquor.

Baked cores made with ordinary sulfite liquor preparations on immersion in water fall apart and the water becomes stained or colored. Cores made with the present composition do not give up color with water and remain standing in water in good condition for an indefinite time.

What I claim is:—

1. As a new binder an ammoniated concentrated sulfite liquor freed of much or most of its mineral bases; said binder usually but not invariably containing some phosphoric acid and said binder when baked with sand passing into a form giving no color with water.

2. As a new binder an ammoniated concentrated sulfite liquor freed of much or most of its mineral bases and containing a small proportion of oil emulsified therewith; said binder usually but not invariably containing some phosphoric acid and said binder when baked with sand passing into a form giving no color with water.

3. As a new binder an ammoniated concentrated sulfite liquor freed of much or most of its mineral bases and containing a small proportion of petroleum oil emulsified therewith; said binder usually but not invariably containing some phosphoric acid and said binder when baked with sand passing into a form giving no color with water.

4. The process of improving sulfite waste liquor preparations as core binders which comprises removing the lime and other bases present, and adding ammonia.

5. The process of improving sulfite waste liquor preparations as core binders which comprises treating concentrated sulfite waste liquor preparations with sulfuric acid in amount sufficient to combine with the lime present, neutralizing with ammonia and filtering.

6. The process of improving sulfite waste liquor preparations as core binders which comprises treating concentrated sulfite waste liquor preparations with sulfuric acid in amount sufficient to combine with the lime present, neutralizing with ammonia, adding some ammonium phosphate and filtering.

7. The process of improving sulfite waste liquor preparations as core binders which comprises removing the lime and other bases present, adding ammonia, and emulsifying with a minor proportion of a viscous oil.

8. The process of improving sulfite waste liquor preparations as core binders which comprises removing the lime and other bases present, adding ammonia, and emulsifying with a minor proportion of a viscous petroleum oil.

In testimony whereof, I have hereunto affixed my signature.

HENRY HICKS HURT.